| United States Patent [19] | [11] | 4,277,344 |
|---|---|---|
| Cadotte | [45] | Jul. 7, 1981 |

[54] INTERFACIALLY SYNTHESIZED REVERSE OSMOSIS MEMBRANE

[75] Inventor: John E. Cadotte, Minnetonka, Minn.

[73] Assignee: FilmTec Corporation, Minetonka, Minn.

[21] Appl. No.: 14,164

[22] Filed: Feb. 22, 1979

[51] Int. Cl.³ .................. B01D 13/00; B01D 31/00; B32B 27/34; B32B 33/00

[52] U.S. Cl. .................. 210/654; 210/490; 427/243; 427/340; 428/420; 428/474.4; 428/475.2; 428/475.5; 428/475.8; 428/476.3; 428/479.3; 428/543; 210/500.2

[58] Field of Search .............. 428/474.4, 476.3, 476.9, 428/479.3, 483, 507, 516, 520, 419, 420, 475.2, 475.5, 475.8, 543; 210/500 M, 490, 654; 427/243, 340

[56] References Cited

U.S. PATENT DOCUMENTS

| 3,260,691 | 7/1966 | Lavin et al. | |
|---|---|---|---|
| 3,367,504 | 2/1968 | Westmoreland . | |
| 3,417,870 | 12/1968 | Bray . | |
| 3,480,588 | 11/1969 | Lavin et al. | 260/47 |
| 3,551,244 | 12/1970 | Forester et al. | 156/246 |
| 3,567,632 | 3/1971 | Richter et al. | |
| 3,597,393 | 8/1971 | Bach et al. | |
| 3,600,350 | 8/1971 | Kwolek . | |
| 3,615,024 | 10/1971 | Michaels . | |
| 3,619,424 | 11/1971 | Blanchard et al. | |
| 3,642,707 | 2/1972 | Frazer . | |
| 3,648,845 | 3/1972 | Riley . | |
| 3,663,510 | 5/1972 | Peterson . | |
| 3,687,842 | 8/1972 | Credali et al. | |
| 3,690,811 | 9/1972 | Horning . | |
| 3,692,740 | 9/1972 | Suzuki et al. | |
| 3,696,031 | 10/1972 | Credali et al. | |
| 3,710,945 | 1/1973 | Dismore . | |
| 3,744,642 | 7/1973 | Scala et al. | 210/500 M |
| 3,878,109 | 4/1975 | Ikeda et al. | 210/500 M |
| 3,904,519 | 9/1975 | McKinney et al. | 210/23 |
| 3,920,612 | 11/1975 | Stephens . | |
| 3,926,798 | 12/1975 | Cadotte . | |
| 3,951,815 | 4/1976 | Wrasidlo | 528/424 |
| 3,993,625 | 11/1976 | Kurihara et al. | 210/500 M |
| 3,996,318 | 12/1976 | van Heuven | 210/500 M |
| 4,020,142 | 4/1977 | Davis . | |
| 4,039,440 | 8/1977 | Cadotte | 210/500 M |
| 4,048,144 | 9/1977 | Stephens . | |
| 4,051,300 | 9/1977 | Klein . | |
| 4,142,020 | 2/1979 | Okamura et al. | 210/500 M |

*Primary Examiner*—James C. Cannon
*Attorney, Agent, or Firm*—Merchant, Gould, Smith, Edell, Welter & Schmidt

[57] ABSTRACT

Good salt rejection and flux characteristics can be obtained with reverse osmosis membranes made from crosslinked, interfacially polymerized aromatic polyamides, particularly poly(arylenepolyamine aromatic-polycarboxylamides) such as poly(phenylenediamine trimesamide). The aromatic polyamides are preferably synthesized directly from an essentially monomeric polyacyl halide (at least tri- or higher in acyl functionality) and an essentially monomeric arylene polyamine with a measurable water solubility. As compared to closely analogous linear polymers, these interfacially polymerized, crosslinked polyamides have a lower % elongation and lower solubility (e.g. in amide solvents). Chlorine resistance characteristics of these polyamides are also good and can be improved by treatment with a chlorinating agent. In the preferred practice of the method for making a reverse osmosis membrane, a porous support layer is coated with the polyamine component (e.g. an aqueous solution of phenylene diamine); the thus-coated support is contacted with the polyacyl halide component (e.g. trimesoyl chloride), thereby initiating the interfacial polymerization in situ on the support; and the resulting product is dried to provide a composite membrane comprising the polyamide laminated to the porous support.

21 Claims, No Drawings

INTERFACIALLY SYNTHESIZED REVERSE OSMOSIS MEMBRANE

CROSS REFERENCE TO RELATED APPLICATION

My copending applications Ser. No. 2,396, filed Jan. 10, 1979 and Ser. No. 958,593, filed Nov. 7, 1978 contain disclosures of similar technology.

TECHNICAL FIELD

This invention relates to permselective barriers in the form of thin films or composites thereof for the selective separation of fluid mixtures and solutions. An aspect of this invention relates to aromatic polyamides (preferably ultrathin polyamides on porous supports) suitable for reverse osmosis desalination of aqueous solutions containing dissolved solutes, to the process for preparing these membrane compositions, and to the process for using such membranes.

BACKGROUND OF THE PRIOR ART

It is known that dissolved substances (e.g. salts) can be separated from their solvents (e.g. water) by a technique known as "reverse osmosis". For example, potable or less salty water can be obtained from seawater, contaminated water, brackish water, or brine by this technique. Similarly, a "soft" water or relatively deionized water or water with reduced "total dissolved solids" can be obtained from a relatively "hard" water by the same or a similar technique. The latter application of the technique can be important in industry, e.g. for providing a relatively "soft" (calcium- and magnesium-free) water from a relatively "hard" tap water.

The use of this technology which has probably gained the widest attention to date is the desalination of brackish water or seawater to provide large volumes of relatively non-salty water for industrial, agricultural, or home use. What is involved here is literally a filtering out of dissolved ions or molecules by applying pressure to the seawater or other water solution and forcing the water through the reverse osmosis membrane, so that purified water passes through the membrane and the salt is "rejected" (i.e. filtered out). Osmotic pressure works against the reverse osmosis process, and the more concentrated the feed water, the greater the osmotic pressure which must be overcome.

To be practical, a reverse osmosis membrane must have very high "salt rejection" characteristics. If the concentration of the salt or other solute is not reduced by at least a factor of 10 in the first pass through the membrane, the solute level in the effluent water will still be too high for most purposes. Indeed, many commercial applications of the permeate or purified water required that the solute concentration be reduced by a factor of approximately 50 or more.

Reverse osmosis membranes have been prepared from a wide variety of known or preformed polymeric materials. Many of these known reverse osmosis membranes can reduce the concentration of solute by a factor of more than 50 (i.e. they have "salt rejection" capabilities in excess of 98%). However, a high salt rejection capability is not by itself enough for commercial practicality. In addition, the membrane should permit high flow rates or fluxes at reasonable pressures. For example, if in the case of seawater an applied pressure of 100 atmospheres provided a flux rate of less than ten gallons/ft$^2$-day (ten gfd, equivalent to about 410 liters/m$^2$-day), the volume of water processed by the membrane per unit of membrane surface would be insufficient for most of the important applications of the technology. Currently, process economics indicate a need for membrane fluxes of 600 to 800 liters per m$^2$-day (l/m$^2$-day) at pressures of 55 to 70 atmospheres for seawater feed (35,000 to 42,000 parts per million total dissolved salts). For brackish waters containing 3,000 to 10,000 parts per million (ppm) salts, economically attractive membranes preferably provide permeate fluxes of 600 to 800 l/m$^2$-day at pressures of only 25 to 40 atmospheres. While specific reverse osmosis applications for permselective membranes may deviate from these requirements, such membranes will not ordinarily achieve broad commercial applicability unless they meet these criteria.

In typical commercial applications of reverse osmosis technology, several additional criteria may be imposed by the realities of such applications. Among such additional requirements or criteria are high durability and resistance to compression, resistance to degradation by extremes of pH or temperature, resistance to microbial attack, and stability toward potentially corrosive or oxidative constituents in the feed water. A common constituent in some types of feed water is some form of chlorine which can oxidatively attack some of the prior art membranes. According to U.S. Pat. No. 3,951,815 (Wrasidlo), issued Apr. 20, 1976, the site of attack by chlorine on polyamide membranes is the amidic hydrogen present in the —CO—NH— group. In compositions such as the polypiperazine-amides described in U.S. Pat. Nos. 3,687,842 (Credali et al), issued Aug. 29, 1972, 3,696,031 (Credali et al), issued Oct. 3, 1972, and the 3,951,815 patent cited previously, resistance to oxidative chlorine-containing species (e.g. hydrochlorite) in feed waters appears to have been adequately demonstrated. However, such resistance to attack by chlorine is believed to be atypical for polyamides in general.

In the manufacture or preparation of reverse osmosis membranes, variations are possible, not only with respect to the chemistry of the raw materials, but also with respect to polymerization techniques, lamination techniques, and the like. It presently appears that the optimum type of reverse osmosis membrane is extremely thin, to allow for high fluxes, but as free of flaws or imperfections as polymer chemistry and processing will permit. The two goals of minimal thickness and freedom from flaws are not altogether compatible. As the thickness of any polymeric film or membrane gets below five micrometers ($\mu$M) and approaches molecular thickness (molecular thickness would be on the order of a few nanometers or even less), the probability of holes in the membrane or film structure increases significantly. A given area of membrane surface flawed by even a minimal number of holes of larger-than-molecular size could result in orders of magnitude losses in ppm of solute rejection. Accordingly, much of the technique in this art has been directed toward making extremely thin membranes which are essentially hole-free. Such extremely thin films or membranes lack structural integrity, in the free standing state, whether in the form of sheets or hollow fibers. The integrity can be improved by casting a solution of the polymer in the form of thick, asymmetric films or fibers in which a thin dense surface layer is supported by a porous spongy underlayer of the same material. Another approach involves casting the film or membrane onto a porous support. The porous support can be relatively thick, since it contains a great multitude of holes of largerthan-molecular size, and the structural integrity contributed by such a support does not necessarily reduce the flux.

If the polymer is to be cast from solution, it is normally essential that the polymer have a reasonable level of solubility in some suitable solvent; such solvent-soluble polymers are typically linear and can be assumed to have a crosslink density at or near zero (e.g. less than one crosslink per 100,000 molecular weight).

On the other hand, if the polymeric film or membrane is formed in situ on the support surface, e.g. through chain extension and/or crosslinking of monomes and/or prepolymers, solubility of the ultimate product (i.e. the thin film or membrane is not essential. In situ polymerization has been used to form a desalination membrane on the surface of a porous support. The membranes thus formed can be far thinner than five micrometers, although thicknesses below 10 nanometers are difficult to achieve in practice, typical thicknesses ranging from 10 or 20 to 1,000 nanometers.

The experience of at least one investigator, P. W. Morgan seems to indicate that interfacially-formed polyamide films prepared directly from the monomers tend to have too much permeability for reverse osmosis, except in those cases where the solute molecules are relatively large. According to Morgan's *Condensation Polymers,* Interscience Publishers, 1965, page 51, in-situ polymerized polyamides formed directly from the monomers can be used in osmosis experiments, but in the washed, undried state, "6-10 polyamide films were readily permeable to inorganic salts and to small dye molecules". Accordingly, although the sweep of polyamide chemistry is extremely broad and highly developed, it would appear from experiences such as those of Morgan that only a portion of this broad sweep can be brought to bear on the problems of reverse osmosis technology. And, as noted previously, polyamides formed from polycarboxylic acids or their functional equivalents and primary polyamines (i.e. polyamides having amidic hydrogen) can be sensitive to attack by agents such as the hypochlorites. Still another limitation on the use of polyamide chemistry is suggested in Richter et al, U.S. Pat. No. 3,567,632, issued Mar. 2, 1971. This patent discloses reverse osmosis desalinationmembranes formed from essentially linear aromatic polyamides, which polyamides have a high solubility in one or more selected solvents. Richter et al point out that the solubility requirements appears to be a critical restriction on reverse osmotic desalination performance.

The art of polyamide chemistry, even as applied to the specific field of reverse osmosis membranes has become so vast in recent years that it is difficult to provide an exhaustive list of pertinent citations from the patent and scientific literature. The following citations are believed to be representative.

I. U.S. Patents

| Patent No. | Patentee | Issue Date |
|---|---|---|
| 3,260,691 | Lavin et al | July 12, 1966 |
| 3,367,504 | Westmoreland | February 6, 1968 |
| 3,417,870 | Bray | December 24, 1968 |
| 3,480,588 | Lavin et al | November 25, 1969 |
| 3,551,244 | Forester et al | December 29, 1970 |
| 3,567,632 | Richter et al | March 2, 1971 |
| 3,597,393 | Bach et al | August 3, 1971 |
| 3,600,350 | Kwolek | August 17, 1971 |
| 3,615,024 | Michaels | October 26, 1971 |
| 3,619,424 | Blanchard | November 9, 1971 |
| 3,642,707 | Frazer | February 15, 1972 |

-continued

| Patent No. | Patentee | Issue Date |
|---|---|---|
| 3,648,845 | Riley | March 14, 1972 |
| 3,663,510 | Peterson | May 16, 1972 |
| 3,687,842 | Credali et al | August 29, 1972 |
| 3,690,811 | Horning | September 12, 1972 |
| 3,692,740 | Suzuki et al | September 19, 1972 |
| 3,696,031 | Credali et al | October 3, 1972 |
| 3,710,945 | Dismore | January 16, 1973 |
| 3,744,642 | Scala et al | July 10, 1973 |
| 3,878,109 | Ikeda et al | April 15, 1975 |
| 3,904,519 | Mckinney et al | September 9, 1975 |
| 3,920,612 | Stephens | November 18, 1975 |
| 3,926,798 | Cadotte | December 16, 1975 |
| 3,951,815 | Wrasidlo | April 20, 1976 |
| 3,993,625 | Kurihara et al | November 23, 1976 |
| 3,996,318 | van Heuven | December 7, 1976 |
| 4,005,012 | Wrasidlo | January 25, 1977 |
| 4,020,142 | Davis et al | April 26, 1977 |
| 4,039,440 | Cadotte | August 2, 1977 |
| 4,048,144 | Stephens | September 13, 1977 |
| 4,051,300 | Klein et al | September 27, 1977 |

II. Scientific Literature

*Condensation Polymers,* Chapter II, Interscience Publishers, 1965.

S. Sourirajan, *Reverse Osmosis and Synthetic Membranes,* National Research Counsil of Canada, 1977, Chapter 9 (by P. Blais).

NTIS Report No. PB 253 193/7GA (April, 1976).

Office of Saline Water Research and Development Progress Report No. 359, October, 1968.

Of the foregoing patents, U.S. Pat. Nos. 3,567,632, 3,600,350, 3,710,945, 3,878,109, 3,904,519, 3,920,612, 3,951,815, 3,993,625, and 4,048,144 contain typical disclosures illustrating the formation of permselective membranes from polyamides (including aromatic polyamides) or their polyamine and polycarboxylic starting materials or precursors or chain-extenders. Also of interest in this regard are U.S. Pat. Nos. 3,619,424, 3,996,318, 4,005,012, 4,020,142, and 4,039,440. U.S. Pat. Nos. 3,260,691 and 3,480,588 relate to coating compositions prepared from condensation products of aromatic primary diamines and aromatic tricarboxylic compounds. U.S. Pat. Nos. 3,744,642 and 3,996,318 contain extensive discussions regarding the technique of interfacial polycondensation or other polymerization reactions conducted at an interface, particularly with respect to the utility of this technique in making reverse osmosis or desalination membranes. Several of the foregoing references include descriptions of membrane shapes or membrane composites designed primarily for the practice of reverse osmosis, purification of a water feedstock, or other permselective processes. Among these are U.S. Pat. Nos. 3,367,504, 3,417,870, 3,648,845, 3,926,798, 4,039,440, and 4,051,300. The preparation and properties of polysulfone support films is described in the Office of Saline Water Research and Development Progress Report No. 359 of October, 1968. Chapter 9 of the book *Reverse Osmosis and Synthetic Membranes* contains an extensive list of polyamide membranes and includes a discussion of their fabrication and properties. The polyamide disclosed in this reference are additionally described in several of the previously cited patents, including U.S. Pat. Nos. 3,567,632, 3,600,350, 3,687,842, 3,696,031, 3,878,109, 3,904,519, and 3,993,625. See also the previously cited NTIS Report of April, 1976.

SUMMARY OF THE INVENTION

It has now been discovered that superior reverse osmosis membranes or films or layers can be obtained by condensing (a) an essentially monomeric, aromatic, amine-reactive polyfunctional acyl halide (including an essentially monomeric, aromatic, amine-reactive polyacyl halide having a functionality of at least three), which polyfunctional acyl halide has a certain minimum solubility, with (b) an essentially monomeric, aromatic, polyamine having a minimum water solubility, if the reaction includes crosslinking and is conducted interfacially by contacting the polyacyl halide with an aqueous solution of the polyamine. Some polyacyl halides (e.g. trimesoyl chloride) have sufficient vapor pressure under suitable processing conditions to provide a gaseous reactant which can be contacted with the aqueous polyamine solution. However, a generally more convenient interfacial polymerization technique involves contacting the polyamine solution with a substantially nonpolar organic liquid solution of the polyacyl halide, hence the minimum solubility requirements for this polyacyl halide reactant. The substantially nonpolar solvent for the polyacyl halide can be a liquid alkane, liquid halogenated lower alkane, or the like, solvents relatively inert toward porous supports (e.g. porous polysulfone) being preferred.

The resulting polyamide layer is crosslinked, as indicated by a lower percent elongation than the corresponding linear polymer, a relatively high molecular weight, and a general lack of solubility, even in solvents such as the liquid organic amides. Tests indicate high salt rejection capabilities, high flux rates, and other desired properties are possessed by these interfacially polymerized, crosslinked polyamides.

Once formed, these interfacially polymerized, crosslinked polyamides are not well suited to shaping steps which would permit the formation of hollow fibers or the like. The most suitable approach to a practice reverse osmosis structure is the formation of a composite comprising a porous support on which the polyamide has been formed. The preferred method for preparing such a composite, permselective membrane comprises the steps of (a) treating a microporous substrate with an aqueous solution of the polyamine, (b) contacting the resulting coated microporous substrate with the polyfunctional acyl halide (preferably dissolved in a nonpolar organic liquid solvent, although, as indicated previously, a vapor phase contacting step can be used for polyacyl halides having sufficient vapor pressure), whereby both crosslinking and chain-extending amide-formingcondensation reactions can occur on the surface of the microporous substrate, and (c) drying the composite permselective membrane at ambient or elevated temperatures.

Particularly outstanding results (high fluxes, high salt rejection, excellent resistance to oxidative attack by chlorine or chlorine-releasing agents, etc.) have been obtained with a crosslinked, water permeable, interfacially polymerized, ultrathin layer comprising poly(phenylenediamine benzenetricarboxylamide).

DEFINITIONS

Throughout this specification, the following terms have the indicated meanings.

The term "gfd" is an abbreviated expression for gallons per square foot per day (gal./ft.$^2$-day), which is equivalent to 40.8 liters per square meter per day (l/m$^2$d) or 0.0408 m$^3$/m$^2$d.

"Essentially monomeric" refers to a chemical compound capable of chain extension and/or crosslinking and/or other polymerization reactions, which compound is relatively low in molecular weight, is typically readily soluble in one or more common liquid solvents, and is generally free of repeating units linked by polyamide (—CO—NH—) linkages. However, provided that the solubility in liquid alkane (including halogenated alkane) solvents is not reduced to less than, for example, 0.01% w/w, one or two repeating polyamide units can be present and the compound can still have some "essentially monomeric" character. It is generally much easier to have a very small number of repeating units if the linkages are not of the amide type but rather of the oxo type (e.g. ethers, esters, etc.); for example, in the case of a polyfunctional acyl halide monomer, the functionality can be increased by linking two triacyl halides to form a tetraacyl halide.

"Soluble" (e.g. "water soluble") denotes a measurable solubility in the solvent which exceeds a desired level (e.g. greater than 0.01 weight-percent or, more typically, greater than 1.0 weight-percent) under ordinary conditions of temperature and pressure (e.g. 20°–25° C., and 1.0 atmosphere).

"Chain extension" refers to a type of chemical reaction, in this context generally intermolecular in nature, which causes the formation of a linear chain of repeating monomeric units or increases the size of an existing molecular chain in an essentially linear fashion (i.e. without necessarily increasing the crosslink density of the polymer or molecular chain).

"Nonpolar solvent" refers to solvents having a polarity or dipole moment which is no greater than the polarity or dipole moment of the low molecular weight, liquid, halogenated hydrocarbon solvents (e.g. dichloromethane). Accordingly, "nonpolar solvents" are considerably less polar than the typical polar solvents such as water, $C_1$–$C_3$ alkanols, ammonia, etc. and tend to be less than about 5 weight-percent soluble in water at 20° C. Typical liquid "nonpolar solvents" include the $C_1$–$C_{12}$ aliphatic (including halogenated aliphatic) solvents such as the alkane (including halogenated alkane) solvents and cycloaliphatic liquids (typically having five or six carbon atoms and typically being fully saturated or having a very low level of unsaturation). The "liquid" solvents, in this context, are solvents which are liquid under normal ambient conditions of temperature and pressure (e.g. 23° C./1.0 atmosphere). The most conveniently used solvents are the $C_1$–$C_3$ halogenated aliphatics, the $C_5$–$C_8$ alkanes, $C_5$ and $C_6$ cycloaliphatics, etc. Solvents likely to initiate chemical or physical attack upon commonly used substrate materials (e.g. porous polysulfone) are not preferred, and even some of the $C_1$–$C_3$ halogenated aliphatics are unsuitable for this reason. Alkane and cycloalkane solvents are less likely to attack substances such as polysulfone. It is also preferred that these solvents be nonhydrolytic so that they will not, by themselves, chemically attack acyl groups such as the carboxylic acid halide group (—COX, wherein X is halogen). As will be explained subsequently, it appears to be important that the acyl halide groups of the polyfunctional acyl halide remain intact until condensation reactions between these groups and the primary amine groups have begun to occur.

The term "ultrathin" is defined in U.S. Pat. No. 3,551,244 (Forester), issued December 29, 1970 as referring to films, membranes, or layers having a thickness in the range of 0.05 to 5 μM. In the context of this invention, thicknesses down to as low as 0.01 μM could impart some salt rejection properties to a suitable membrane/support composite. The lower figure of 0.05 μM in the Forester patent merely reflects the difficulties, in commercial practice, of obtaining uniform results with thicknesses below 0.05 μM.

"Interfering substituents" refers to substituents capable of interfering with intermolecular aminecarboxylic acid, amide-forming condensation reactions. Such interference is generally steric and/or chemically reactive. An example of steric interference or steric hindrance would be the location of a substituent other than hydrogen on a ring position adjacent to an acyl halide substituent on the polyacyl halide reactant. An example of chemical interference would be the location of an acyl-reactive substituent on the polyacyl halide or an amine-reactive substituent on the polyamine. Such chemically interfering substituents could lead to the formation of internal esters, internal amides, internal salts, or the like. Another possible consequence of permitting such interfering substituents, even assuming they are slow-enough reacting so as not to form internal salts, etc. is an unpredictable effect upon crosslink density. The sequence of chain-extending and crosslinking reactions during in-situ polymerization practiced according to the teachings of this invention is not well understood, and the effect of chain branching from an aromatic polyamine unit in lieu of branching from an aromatic polyacyl unit is difficult to estimate with respect to properties such as flux, salt rejection, and chlorine resistance.

"Volatilizable" indicates a solid or liquid compound which has a measurable vapor pressure under normal atmospheric pressure and normal ambient or moderately elevated ambient temperatures. A typical "volatilizable" compound can be boiled at normal atmospheric pressure and temperatures below 500° C. Thus, isophthaloyl chloride and trimesoyl chloride would be "volatilizable", since it is possible to volatilize these compounds at temperatures elevated above ambient conditions to achieve adequate rates of interfacial reaction with polyamine solutions.

DETAILED DESCRIPTION

Experience indicates that Morgan's observation regarding interfacially-formed polyamide films prepared directly from the monomers has a great deal of validity. For example, some interfacially condensed polyamides prepared from trimesoyl chloride and secondary diamines have been observed to have relatively low sodium chloride rejection characteristics, possibly due to excess permeability of the polyamide. Indeed, with a wide variety of in-situ polymerized membranes it has proved difficult to achieve rejection rates higher than 98% of the dissolved salts in seawater under typical reverse osmosis applied pressures, or, when such high rejection rates are achieved, fluxes may fall well below 600 l/m²d at 70 atmospheres pressure or more. Accordingly, some investigators have resorted to pre-formed polymers which are chain-extended or crosslinked in situ on the surface of a porous support.

It has now been discovered, however, that formation of ultrathin polyamides having excellent salt rejection and flux characteristics is possible through interfacial polymerization of carefully selected, essentially monomeric polyamine and polycarboxylic starting materials. These essentially monomeric starting materials should meet a number of criteria. First, both the polycarboxylic and polyamine monomers should be aromatic. The reason for the aromaticity of the starting materials is not fully understood at the present time. Second, the starting materials should be low in molecular weight. Their aromatic nuclei are preferably monocyclic, and the presence of more than two aromatic rings in the aromatic nucleus of a starting material is considered likely to lead to a variety of extremely difficult problems. Third, the amine functional groups of the aromatic polyamine should be primary rather than secondary. Surprisingly, the use of phenylene diamines can provide adequate chlorine resistance despite the amidic hydrogen. Fourth, an essential component of the interfacial reaction mixture is a polyacyl halide having at least three acyl halide groups substituted on the aromatic nucleus. This degree of functionality in the acyl halide insures the occurrence of reasonably frequent polyamide branching sites having the formula

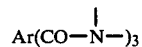

or Ar(CONH—)₂COOH, the latter being a potential branching site, the Ar representing an aromatic nucleus. It also appears to be important that the polyamine reactant have a primary amine functionality which is no greater than the acyl functionality of the polyacyl halide. In addition, it is preferred that the starting materials be free of interfering substituents. Fifth, the polyamine and polycarboxylic starting materials should be highly reactive toward each other under normal ambient conditions of temperature and pressure. The polyacyl halide and the polyamine should form amide linkages, should be at least 30% reacted, and should form at least some crosslinks in less than 60 seconds (preferably less than one second) under these conditions. It has been found that not all functional equivalents of the carboxylic acid (—COOH) group have sufficient reactivity for use in this invention. For example, carboxylic acid anhydrides react too slowly to provide the desired crosslink density. Similarly, the carboxylic acid group itself reacts too slowly with aromatic primary amine functional groups. The preferred functional equivalent of the —COOH group is a carboxylic acid halide such as —COCl. Apparently, the elimination of HCl is sufficiently favored from a kinetic and/or thermodynamic standpoint to meet the criteria of this invention. The starting materials should also be selected with a view toward obtaining a polyamide having a molecular weight in excess of 100,000, a crosslink density of at least one per 100,000, a lower pecent elongation than the corresponding linear polymer, and a solubility in liquid organic amide, sulfoxide, and pyrrolidone solvents or solvent blends which is less than 10% by weight.

If these criteria are satisfied, good salt rejection and flux characteristics are achieved, at least with composite membranes comprising the polyamide polymerized in situ on a porous support layer.

For purposes of this discussion, a membrane is considered to lack significant desalination capabilities if it will not reject at least 85 conductivity-% of the dissolved solids in seawater or simulated seawater when tested at a reverse osmosis pressure of 600 to 1,000 pounds per square inch (about 40–70 atmospheres) at a flux of at least about 10 gfd (above 400 l/m²d). Indeed, a membrane which merely met and did not exceed these standards would have only some very specialized uses and would not be considered a practical one-pass membrane suitable for the typical commercial desalination operation. Somewhat greater utility can be provided when the salt rejection capability exceeds 90% by weight (e.g. 94% by weight) at more than 10 gfd, e.g. at 15 gfd (e.g. at 600 l/m²d or higher). A true single-pass membrane for seawater desalination should have a salt rejection capability above 98% (e.g. at least 99% by weight) at the 15 gfd flux.

As the salt rejection increases beyond 90% by weight, the effect upon the permeate water increases by orders of magnitude. For example, in the case of seawater containing 35,000 ppm total dissolved solids, rejection of 90% (31,500 ppm) of these solids results in a permeate water containing 3,500 ppm—a relatively impure water from the standpoint of many industrial and agricultural uses. An increase in salt rejection to 94% at the same flux decreases the dissolved solids in the permeate by more than a third. At the 98% rejection level, the purity of the permeate (700 ppm solids) is approaching or has reached a level suitable for a wide variety of commercial and agricultural uses. Carrying this analysis still further, the difference between 99% and 98% salt rejection, viewed from the standpoint of the purity of the permeate, is not merely a percent but rather a halving of the total dissolved solids. Very close to universal utility for the permeate can be considered to have been achieved when the total dissolved solids has been brought below 700 ppm or, more preferably, below 500 ppm, e.g. 250–500 ppm.

In the detailed description which follows, the preferred starting materials will first be described, followed by a description of the preferred methods for forming the desired polyamides and composites including these polyamides.

The amine-reactive component of the polyamide-forming reaction system is generally an aromatic polycarboxylic acid halide. Although up to about 50% by weight of the amine-reactive component can comprise a dicarboxylic acid halide, a polycarboxylic acid halide with a functionality of at least three should be present for adequate crosslinking from polyacyl branching sites on the ultimately obtained polymer molecule. Typical preferred polycarboxylic acid halides are represented by the formula $Ar(COX)_a$, where Ar is a mononuclear aromatic nucleus free of any amine-reactive groups other than the COX groups; X is halogen of atomic weight ranging from 19 to 130, and a is a number (generally an integer) greater than 2 but not greater than the number of available ring positions on the mononuclear aromatic nucleus. As will be apparent from the foregoing discussion, up to about 50% by weight of the compound $Ar(COX)_a$ is replaceable with the compound $Ar(COX)_{a-1}$, wherein Ar, X, and a are as defined previously.

The acyl halide functional group —COX is preferably selected such that the formation of the compound HX during the amide-forming condensation reaction is strongly favored. Accordingly, chlorine is a suitable halogen for the —COX functional group, not only from the standpoint of ease of formation of either hydrochloric acid or the gas hydrogen chloride, but also from the standpoint of commercial availability and favorable economics. A functionality of three for the polyacyl halide appears to be fully adequate for reaction with aromatic di-primary amines according to the teachings of this invention; accordingly, a preferred polycarboxylic starting material is the acid chloride of trimesic acid (1,3,5-benzene-tricarboxylic acid), also known as trimesoyl chloride. An interesting aspect of this triacid chloride is its symmetry; the compound could also be described as sym.-benzenetricarboxylic acid chloride. The three acid halide groups are equally spaced (they are meta to each other) and are thus relatively free of steric hindrance. Thus, trimesic acid and its acid halides are structurally unique as compared to trimellitic, hemimellitic, pyromellitic, mellophanic, prehnitic acid or acid halide or other acid halides of this type. Even mellitic acid (benzene hexacarboxylic acid), despite its symmetry, does not offer the open ortho positions of the trimesic acid or acid halide molecule. Although this invention is not bound by any theory, it is presently theorized that trimesoyl halides provide the optimum crosslinked, interfacially polymerized structure when reacted with aromatic di-primary amines, due in part to the symmetry and openness of the trimesoyl halide molecule. Some aspect of the chemical structure of the resulting interfacially polymerized poly(arylenediamine sym.-benzenetricarboxylamide) facilitates or provides a host of desirable properties, including high salt rejection, high fluxes, and good resistance to various types of attack, including chemical attack by hypochlorites.

The polyacyl halide should be at least 0.01 weight-% soluble in liquid $C_1-C_{12}$ alkane or liquid halogenated lower alkane solvents. Although the 0.01 weight-% lower limit of solubility is a technical possibility because of the vapor phase or the highly dilute solutions which can be used in the interfacial polymerization reaction, ease of production on a commercial scale dictates a level of solubility exceeding 1 weight-% or more in a suitable nonpolar solvent. Actually, most aromatic polyacyl halides are readily soluble in liquid aliphatic solvents such as the pentanes, hexanes, heptanes, octanes, etc. which are substantially inert toward preferred porous support materials such as the polysulfones.

As noted previously, the aromatic nucleus of the polyacyl halide can contain a plurality of aromatic rings (fused, independent, etc.) if the solubility requirements described previously are still met. With each additional aromatic ring, the solubility of the polyacyl halide decreases drastically. Thus, only the monocyclic and bicyclic aromatic compounds are likely to have suitable solubility characteristics, although material solubility is a technical possibility with tricyclic compounds.

In the case of the aromatic polyamines, there is an equally strong preference (perhaps even a greater preference) for monocyclic and bicyclic aromatic polyfunctional primary amines. Since the principal solvent for the aromatic polyamine used in the preferred method is water, it is particularly desirable to avoid excessive aromatic or hydrocarbon character in the polyamine. Accordingly, when bicyclic polyamines are used, it is preferred that the aromatic rings be independent rather than fused and be joined by a "bridge" having some hydrophilic character, e.g. a divalent oxygen-containing functional group.

The aromatic nucleus of the polyamine can be carbocyclic or heterocyclic, but carbocyclic aromatic polyamines appear to provide a far superior performance. It has also been found that substituents on the aromatic nucleus other than the primary amine groups themselves are likely to detract from the performance of the ultimately obtained polymer. Even substituents as small as a methyl group may have undesirable effects, particularly when substituted on a ring position adjacent to a primary amine group. When polar groups and alkoxy groups are substituted on the aromatic nucleus of the polyamine, an improvement in flux is likely to be observed; however, salt rejection may suffer somewhat.

The preferred polyamines can be represented by the formula Ar'(NH$_2$)$_b$, wherein Ar' is an aromatic nucleus (preferably mononuclear) free of any acyl halide-reactive groups other than the primary amine groups, and b represents a number greater than 1 but less than the functionality of the aromatic polyacyl halide. When a single aromatic primary amine is used rather than a mixture, b will be an integer, typically 2. However, as in the case of the polyacyl halide, mixtures of starting materials having varying functionality can be used, so long as the average for b is greater than 1 and no greater than the functionality of the polyacyl halide. Mixtures with aliphatic or aliphatic heterocyclic polyamines can be used, provided that the major amount of the acyl halide-reactive component comprises the aromatic polyfunctional primary amine. For example, the use of some piperazine mixed with the aromatic polyamine can provide a polyamide with adequate flux characteristics, though salt rejection capabilities may suffer somewhat.

The preferred aromatic polyamine is a monocyclic di-primary amine such as phenylene diamine. Both the meta and para isomers of phenylene diamine provide polyamides with good reverse osmosis properties, although the meta isomer appears to be superior for reasons which are not readily apparent.

Thus, optimum results appear to be obtained with the interfacial polymerization (preferably in situ on a porous support surface) of trimesoyl halide and meta-phenylenediamine. The resulting poly(phenylenediamine trimesamide), in the form of a composite reverse osmosis membrane, provides at least 99.3 percent salt rejection and more than 1,200 l/m$^2$d flux in 6 to 24-hour tests in 3.5% synthetic seawater at 68 atmospheres pressure and 25° C.

A difficult problem often observed in the case of prior art polyamide membranes is the degradative effect of chlorine in the feed water, which effect is manifested typically by substantially lowered salt rejection. It might have been expected that polyamide membranes made according to this invention would also be degraded by chlorine, particularly in view of the available amide hydrogens present in the polymer. Accelerated chlorine tests were made by storing membranes in tap water containing 100 ppm free chlorine for 24 hours. In this test the membrane color changed quickly from white to tan, but the membrane salt rejection remained substantially unchanged in the case of the meta-phenylene diamine trimesamide membrane. In cases where this membrane was not fabricated under optimum amine and acyl halide concentrations, salt rejection after the chlorine treatment ranged from 85 to 97%. Even this loss of salt rejection capability can be minimized or avoided through modification of the polyamide, e.g. by acylation, alkylation, aldehyde condensation, and other reactions which replace the amide hydrogen atoms with crosslinks or other functional groups besides hydrogen. It is surprising, however, that the most effective modification reaction involves a treatment step with chlorine or a chlorine-releasing agent shortly after the meta-phenylene diamine trimesamide has been formed in the interfacial polymerization reaction. Accordingly, a preferred aspect of this invention involves a deliberate chlorine treatment step after the polyamide has been formed but before it is placed in a reverse osmosis unit. Although this invention is not bound by any theory, it is theorized that the chlorine oxidation or chlorination step extracts unreacted aromatic polyamine from the ultrathin polyamide and stabilizes the polyamide against further oxidation.

Wide fluctuations in pH and temperature also appear to have very little adverse effect upon preferred polyamides of this invention. The in-situ interfacially polymerized polyamides also appear to have sufficient hydrophilicity for good flux (water may cause slight swelling of the membrane, but this swelling is of no consequence in the case of composite membranes including a porous support layer). Tests indicate that the preferred poly(arylenepolyamine benzenetricarboxylamides) are resistant to attack by acids and bases, e.g. 1 weight-% hydrochloric acid and 1 weight-% sodium hydroxide at temperatures ranging from normal ambient up to 100° C., at least for several minutes.

Some prior art membranes show a decline in both salt rejection and flux over a period of time. The decline in salt rejection indicates a lack of stability toward the feed water, and the decline in flux may indicate various compaction or clogging phenomena. In some instances, the clogging can be reversed with cleaning steps, but compaction is irreversible. In the case of the preferred interfacially polymerized poly(arylenepolyamine benzenetricarboxylamide) polymers of this invention, given their high level of crosslinking, it is theorized that the crosslinked structures are resistant to compaction phenomena. A long term test on an in-situ, interfacially polymerized poly(meta-phenylenediamine trimesamide) progressed to 432 hours using synthetic seawater as the feed under 68 atmosphere/25° C. conditions, and essentially no decline in the approximately 99.5% salt rejection was observed after this 432 hour test. The flux did decline somewhat due to clogging but, even after 432 hours, a rate roughly double the preferred minimum of 600 l/m$^2$d was observed. Conventional cleaning steps can be used to reverse (at least partially) the decline in flux. A presently preferred cleaning agent is oxalic acid.

Good performance with other feed water has been demonstrated, e.g. with 0.5% sodium chloride at 40 atmospheres; the observed salt rejection under these conditions being 99.0% at 34.5 gfd flux (1407 l/m$^2$d).

Although this invention is not bound by any theory, it is theorized that the acyl halide groups on the polyfunctional acyl halide are in a competitive situation during the reaction with the aqueous solution of the polyamine. The acyl halide groups can react either with water or with the primary amine groups. Still another possibility is a sequential reaction in which hydrolysis precedes condensation with an amine group. In any event, it is believed that chain extension reactions will occur with great speed, so that long linear chains will be formed. These linear chains probably contain frequently occurring sites for crosslinking. The most likely crosslinking sites are the amine hydrogens and the non-hydrolyzed, otherwise unreacted acyl halide groups (i.e. pendent carboxylic acid halides). Accordingly, up to one crosslink per about 290 or 300 molecular weight units is likely to be the maximum crosslink density which can be achieved with the preferred starting materials. Since free, unreacted carboxylic acid groups are a possibility, and since admixture of the triacyl or tetraacyl halide with a diacyl halide can be practiced within the scope of this invention, a much greater distance between crosslinks would be more typical, e.g. 1,000 or 10,000 molecular weight units. Since linear chains in excess of 100,000 molecular weight units are not typical, and since the physical properties of the preferred polyamides indicate the linking together of at least two linear chains and perhaps several more, the desired crosslink density exceeds 1 per 100,000 molecular weight units, e.g. 1 per 50,000. And, as noted previously, the crosslinked polyamides are, for all practical purposes, insoluble in strong organic liquid solvents such as the liquid amides, sulfoxides, and pyrrolidones—indicating at least a moderate crosslink density.

Stated another way, it is expected that the interfacial reaction product contains at least one unit, per 100,000 polymer molecular weight, of the formula

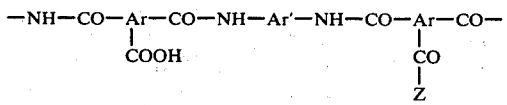

wherein Ar and Ar' are as previously defined, and Z is a continuation of a linear chain stemming out from the branch point or a second linear chain bound to the first linear chain by a secondary amide. Thus, Z can be —NH—AR'—NH—CO— or

The preferred polyamides of this invention appear to be resistant to biological attack and pH fluctuations over a range greater than 4–7.5—for preferred embodiments, the pH can be as low as about 1 or 2 or as high as about 11 or 12. Moderately elevated temperatures (e.g. 35°–100° C.) appear to have minimal adverse effects upon the reverse osmosis properties of the membranes. Reverse osmosis can be practiced with these membranes (particularly the composite type) at pressures well above 70 atmospheres, if desired, e.g. up to about 105 atmospheres.

Although the polyamides of this invention are not well suited for shaping steps due to their crosslinked character and thus are ordinarily unsuited for formation into hollow fibers and the like, they can be effectively made into flat ultrathin layers which can be laminated to porous support layers, the preferred lamination technique being simply the in-situ interfacial polymerization of the monomers on the support. For a different technique of lamination, see the aforementioned Forester et al patent, U.S. Pat. No. 3,551,244. There are applications of reverse osmosis technology where the reverse osmosis membrane (including composite membranes) is best utilized in flat sheet form. For example, spiral-wound reverse osmosis modules use the flat sheet configuration. When the feed water contains particulate matter, spiral-wound membrane elements are preferred over hollow-fiber elements because of the lesser tendency for membrane fouling. At the present time, the available prior art aromatic polyamide membranes having practical utility are mostly in the form of hollow fibers.

Suitable support films or membranes have been described extensively in the prior art. A wide variety of support materials have been used with some degree of success. The preferred support materials are those prepared from organic polymeric materials such as polysulfone, chlorinated polyvinyl chloride, polyvinyl butyral, polystyrene, cellulose esters, and other organic polymeric materials which can be made microporous so as to have millions of pores per square centimeter. Typical pore sizes range from about 1 to about 1,000 millimicrons in their widest dimension. Pores larger than 1,000 millimicrons are difficult to bridge over with ultrathin reverse osmosis membrane. Pores smaller than one millimicron are not necessary for salt rejection, and pores up to about 20 millimicrons or more provide good permselective effects. Porous polysulfone film has been found to be a particularly effective support material for the ultrathin interfacially condensed polyamides of this invention. Preparation of such film is described in the aforementioned U.S. Pat. Nos. 3,926,798 and 4,039,440 and in the previously cited OSW R&D Progress Report No. 359 of October, 1968. See column 2, lines 26–36 of U.S. Pat. No. 4,039,440 and Examples 1–3 of U.S. Pat. No. 3,926,798, both of which disclosures are incorporated herein by reference. The polysulfone can have a molecular weight under 100,000 (e.g. 20,000–40,000) and a thickness up into the hundreds of $\mu M$ but more typically on the order of 5–100 $\mu M$.

Some work has been done in the field of reverse osmosis with inorganic support materials such as glass, sintered metals, ceramics, and other microporous inorganic materials.

Since the interfacially condensed aromatic polyamides of this invention can be prepared directly from monomers such as benzene polycarboxylic acid halides and arylene polyamines, it is preferred to carry out the interfacial polymerization reaction on the support surface, e.g. on the microporous organic polymeric film. So long as the pores on a support surface have the desired diameter (e.g. an average of about 20 nanometers—considerably coarser pores can be present on the "back" surface), the ultrathin film resulting from the interfacial chain extension and crosslinking reactions can bridge over the pores and provide a relatively defect-free reverse osmosis layer—the layer which is the key element of the resulting composite.

As noted previously, one hazard often encountered with this in-situ interfacial polymerization approach is the formation of ultrathin membranes with a large number of defects, resulting in very high flux rates but very low salt rejection. For example, diacyl halides such as isophthaloyl chloride, terephthaloyl chloride, 2,6-pyridinedicarboxylic acid chloride, and phenylphosphoric dichloride should not be used in the context of this invention except in combination with acyl halides having a functionality greater than 2, e.g. trimesoyl chloride. The benefits of mixing the dicarboxylic acid halides with the higher functionality polyacyl halides appear to be insubstantial, and the amine-reactive component can be simplified by using only the tri- or higher functionality material.

As is known in the art, the porous support material can be coated with an aqueous solution of the polyamine, thereby providing a thin film of aqueous medium for the interfacial reaction. The nonpolar phase of the interfacial reaction medium can then be brought into contact with this thin film; because of the substantial incompatibility of the aqueous phase and the nonpolar phase, the reaction will take place substantially only at the interface. Unlike stirred and homogeneous reaction systems, the molar ratios of acyl halide to primary amine are not critical, and one need only focus his attention upon the concentrations of the reactants in their respective solvent media. If the polyfunctional aromatic acyl halide is volatilizable, contact between the aqueous solution of polyamine and the acyl halide can be accomplished by exposing the aqueous solution to acyl halide vapor. The result in this water phase/vapor phase reaction is very similar to liquid/liquid interfacial reactions, at least in the case where preferred polyacyl reactants are used. The preferred approach, however, is to provide a liquid/liquid interface by dissolving the polyacyl reactant in a nonpolar solvent of the type described previously, e.g. hydrocarbons such as $C_5$–$C_8$ alkanes and chlorine- or fluorine-containing solvents which do not dissolve or plasticize the organic polymeric support material. For example, it has been found that "FREON" TF (trichlorotrifluoroethane) does not excessively attack or plasticize a polysulfone support layer. For optimum results, a freshly cast polysulfone support layer is used to form the composite membrane. Application of the polyamine solution to the porous support can be conveniently and efficiently accomplished by saturating the support with the polyamine solution followed by pressing of the support to remove excess solution. For reasons not presently understood, however, simply draining the excess amine solution from the surface of the support film results in the production of membranes with somewhat higher flux.

The concentration of the polyamine in the aqueous solution is not critical, and dilution to as low as 0.01 weight-%, while not preferred, may provide an adequate concentration level. Concentrations ranging from 0.1 to 10% by weight of the polyamine are preferred, more preferably 0.5 to 3%. The optimum concentration of phenylenediamine appears to be about 2% by weight.

The optimum concentration of the polyacyl halide appears to be roughly in the same range as that of the polyamine, although concentrations below the optimum for the polyamine (e.g. 0.1% by weight) are normally preferred. Thus, the polyacyl halide is typically dissolved in the nonpolar solvent at a concentration ranging from 0.1 to 10 weight-%, and total miscibility or even high solubility of the polyacyl halide in the nonpolar solvent is not required.

The polymerization (chain extension and cross-linking) reactions between the polyamine and the polyacyl halide are preferably carried out under normal ambient conditions—substantial heating of the reaction system being particularly undesirable. After formation of the ultrathin polyamide, the composite is preferably dried and can be dried under normal ambient conditions (e.g. air-dried at 20°–25° C.). The drying can be speeded up with very moderate heating, but drying temperatures in excess of 80° C. should be avoided to prevent residual reactants on the support film from fusing the pores in the support and reducing membrane flux.

Surface active agents and inorganic bases or tertiary amines (or other acid acceptors) are commonly added to the aqueous phase in polyamide-forming interfacial reactions. Among the commonly used acid acceptors are sodium phosphate, sodium hydroxide, and N,N-dimethylpiperazine, with or without the addition of surface active agents such as dodecyl sodium sulfate. These surfactant and acid-accepting additives did not appear to provide any advantage in the context of this invention; it is actually preferred to carry out the interfacial polymerization without the presence of acid acceptors.

In the liquid/liquid interfacial reaction, a particularly convenient and efficient technique for bringing the nonpolar liquid phase into contact with the aqueous phase is simply to immerse the porous support coated with the aqueous polyamine into the nonpolar solvent solution of the polyacyl halide for a time sufficient to form the ultrathin polyamide. The immersion time can be short in view of the great speed of the reaction. For example, an immersion time or contact time of 0.5–60 seconds can be sufficient. Contact times less than 60 seconds can be advantageous from the standpoint of high volume production.

Additional structural integrity can be provided for the composite membrane by laminating the polyamide/polysulfone composite to a second support film or layer which is preferably a flexible, porous, organic polymeric material which can be fibrous in nature if desired. An example of a fibrous backup or support material is a paper-like web of spun-bonded polymeric (e.g. polyethylene) fibers having diameters in the micrometer range.

After the interfacially polymerized, crosslinked aromatic polyamide has been formed, its crosslink density can be further increased by post-polymerization reactions with crosslinking or molecular weight-increasing agents such as methane sulfonyl halides, epihalohydrins, trimethylaminesulfur trioxide complex, formaldehyde, glyoxal, and the like. As noted previously, the preferred post-polymerization modification reaction involves a treatment with chlorine or a chlorine-releasing agent.

Flat sheet-type (e.g. spiral wound-type) water purification or permselective modules of this invention are useful for applications such as desalination of seawater, brackish water desalting, whey concentration, electroplating chemical recovery, softening of hard water for municipal or home use, boiler feed water treatment, and other water treatments which involve removal of a solute or contaminant.

In the Examples which follow, all parts and percentages (except salt rejections) are by weight unless otherwise indicated. Salt rejection percentages are determined in the conventional manner by electroconductivity measurements.

EXAMPLE 1

A 15 weight-% solution of polysulfone resin in dimethyl formamide was cast on a glass plate, and the glass plate was immersed in water to gel the polysulfone. After removing the polysulfone support film from the glass plate, the surface which was in contact with the glass but some relatively coarse pores, but the exposed surface (exposed during the casting) had surface pores averaging less than 20 nanometers in diameter.

The freshly cast and gelled support film was immersed in a solution of 2 weight-% m-phenylenediamine in water. After removal of excess m-phenylenediamine solution from the surface of the polysulfone support film, the wet film was then immediately covered with a solution of 0.1% weight/volume trimesoyl chloride (TMC) dissolved in "FREON" TF solvent (trichlorotrifluoroethane). The contact time for the interfacial reaction was 10 seconds, and the reaction was substantially complete in less than 1 second. The resulting polysulfone/polyamide composite was air-dried.

It was found that removal of the excess polyamine solution from the polysulfone could be accomplished either by pressing with a rubber roller or by draining.

In the reverse osmosis test, 3.5% synthetic seawater was used. The synthetic seawater contained sodium, magnesium, and calcium cations and chlorine, sulfate, and carbonate anions. The test lasted up to 24 hours and was conducted at 1,000 psi (68.0 atmospheres) and 25° C. For the pressed polysulfone film, the salt rejection was 99.5% and the flux was 35.4 gfd (1,444 l/m²d).

For the drained polysulfone support, the salt rejection was very slightly lower (99.43%) but the flux was significantly higher, i.e. 43 gfd (1,754 l/m²d).

EXAMPLES 2-6

The procedure of Example 1 was followed, except as indicated in the following Table. In this Table, the abbreviation MPD means m-phenylenediamine.

| Example | Variation in Procedure |
|---|---|
| 2 | 1% MPD |
| 3 | 0.5% MPD |
| 4 | 4% MPD |
| 5 | fabric-backed polysulfone support, excess polyamine solution drained off |
| 6 | Hexane instead of "FREON" TF used as the solvent for TMC |

The reverse osmosis test was run as in Example 1. The results are set forth in the following Table.

| Example | Flux (gfd) | Salt Rejecton (%) |
|---|---|---|
| 2 | 22 | 99.10 |
| 3 | 28.4 | 96 |
| 4 | 33 | 99.10 |
| 5 | 46.6 | 99.25 |
| 6 | 33 | 99.6 |

EXAMPLE 7

The procedure of Example 1 was followed exactly, except that 2% p-phenylenediamine was substituted for m-phenylenediamine. The amine-reactive co-reactant was again 0.1% (w/v) TMC in "FREON" TF. The procedure was repeated three times to provide three samples, sample 7-a, 7-b, and 7-c. The reverse osmosis test conditions were the same as those of Example 1. The observed flux and salt rejection data were:

| Sample | Flux (gfd) | Salt Rejection (%) |
|---|---|---|
| 7-a | 28.8 | 98.6 |
| 7-b | 15.1 | 96 |
| 7-c | 16.6 | 94 |
| Average | 20.2 | 96.2 |

EXAMPLES 8-12

The purpose of these Examples was to demonstrate the use of various diamine components. Otherwise, the procedure followed was the same as that of Examples 1 and 7. The various polyamine components were dissolved in water at a level of 2% by weight, and the diamines are listed below.

Example 8: 4,4-sulfonyldianiline
Example 9: 2% MPD plus 1% piperazine
Example 10: 2,5-diaminotoluene
Example 11: 2% benzidine (diphenyl diamine)
Example 12: 2% 4-methoxy-m-phenylenediamine The reverse osmosis test was conducted as in the preceding Examples. The test data were as follows.

| Example | Flux (gfd) | Salt Rejection (%) |
|---|---|---|
| 8 | 20.6 | 98 |
| 9 | 31 | 96 |
| 10 | 48.8 | 84 |
| 11 | 22.1 | 86 |
| 12 | 35.3* | 95 |

*Average of two samples, 12-a (33.5 gfd) and 12-b (37.1 gfd).

Although the flux rate for Example 10 was outstanding, the salt rejection was not adequate for a single-pass membrane for seawater desalination. Apparently, the presence of a methyl substituent ortho to one of the two primary amine groups was detrimental to the ultimate results, perhaps because of an excessive amount of defects in the ultrathin polyamide. Similar experiments conducted with 2,5-diamino-benzene sulfonic acid definitely indicated the presence of such defects, since the flux was extremely high (90 gfd) and the salt rejection was negligible (37%). A very high flux and a very low salt rejection usually indicates that there are defects in the ultrathin membrane.

EXAMPLE 13

The procedure of Example 1 was followed except that a 0.1 weight-% mixture of TMC and isophthaloyl chloride (IPC) was used in place of 0.1% TMC. The ratio of TMC to IPC was 3:1 by weight. In the reverse osmosis test described in Example 1, no improvement in either salt rejection or flux was observed, although both the salt rejection and the flux were still very good (99 percent/30.5 gfd).

EXAMPLE 14

The composite membrane made according to Example 1 was dried at moderately elevated temperatures in an oven rather than air dried. So long as the drying temperature was kept below 80° C., no significant changes in the fluxes and salt rejection were noted.

EXAMPLES 15 and 16

Post-Polymerization Modification

The composite membrane according to Example 1 was modified by the after treatments described below.

Example 15: reaction with 2% glyoxal and 2% triethylamine for ten minutes at 25° C. followed by oven curing at 110° C.

Example 16: oxidation with 100 ppm of hypochlorite for one day followed by oven drying at 100° C.

In the reverse osmosis test described in Example 1, the results were as follows.

| Example | Flux (gfd) | Salt Rejection (%) |
|---|---|---|
| 15 | 42.4 | 98.63 |
| 16 | 20.5 | 99.53 |

When the modified membrane of Example 15 was given a chlorine treatment, the flux decreased (29.8 gfd) but the salt rejection was slightly increased (98.73%). The change in oxidation state was indicated by a color change.

In the case of Example 16, it was found that the oven drying step reduced the flux but slightly improved the salt rejection. Accordingly, when the Example 1 composite membrane was subjected only to the chlorine oxidation step and not the oven drying at 100° C., the flux was 31 gfd and the salt rejection was 99.25%.

The effect of a treatment with 100 ppm of hypochlorite for 24 hours was investigated with respect to Example 7 (samples 7-a, 7-b, and 7-c) and Example 12 (samples 12-a and 12-b). The reverse osmosis test results (the same test as Example 1) were:

| Sample | BEFORE TREATMENT (see Examples 7 and 12) | | AFTER HYPOCHLORITE TREATMENT | |
|---|---|---|---|---|
| | Flux (gfd) | Salt Rejection (%) | Flux (gfd) | Salt Rejection (%) |
| 7-a | 28.8 | 98.6 | * | * |
| 7-b | 15.1 | 96 | 17.9 | 97 |
| 7-c | 16.6 | 94 | 17.7 | 98.4 |
| 12-a | 33.5 | 95 | 30.4 | 96 |
| 12-b | 37.1 | 95 | 32.4 | 96 |

*No significant change noted.

With respect to the foregoing Examples in particular and, more generally, the foregoing description of this invention and the prior art, it should be kept in mind that the flux is a variable which depends in part upon the feedwater pressure. However, there are significant advantages to using lower feedwater pressures, e.g. 40–70 atmospheres for desalination of seawater, and even lower pressures for some other applications such as water softening.

I claim:

1. A sheet-like composite material comprising a microporous support layer and, supported thereon, a crosslinked, water permeable, interfacially polymerized, ultrathin polyamide desalinizing layer, said desalinizing layer comprising the interfacial condensation reaction product of the components comprising:
   (a) an essentially monomeric, aromatic, amine-reactive reactant comprising a polyfunctional acyl halide, the amine-reactive acyl halide groups of said polyfunctional acyl halide being capable of condensing with primary amine functional groups to form amide linkages in less than 60 seconds under normal ambient temperature and pressure; said polyfunctional acyl halide having at least three of said acyl halide groups substituted on an aromatic nucleus comprising less than 3 aromatic rings; said amine-reactive reactant being at least 0.01 weight percent soluble in liquid aliphatic or liquid halogenated aliphatic solvents; said aromatic nucleus being free of substituents capable of chemical interference with inter-molecular amide-forming condensation reactions;
   (b) an essentially monomeric, aromatic, polyamine reactant having at least two primary-amine substituents substituted on an aromatic nucleus comprising less than 3 aromatic rings; the primary amine functionality of said aromatic polyamine reactant being no more than the carboxylic acid equivalent functionality of said polyfunctional acyl halide; said aromatic polyamine reactant having a solubility in water of at least 0.01% by weight and being free of substituents capable of chemical interference with intermolecular amide-forming condensation reactions;
   said polyamide layer having a lower percent elongation than the corresponding linear polymer; a molecular weight in excess of 100,000; a crosslink density of at least 1 per 100,000; a solubility in liquid organic amide, sulfoxide, and pyrrolidone solvents or solvent blends which is less than 10% by weight; a salt rejection capability, tested with simulated sea water under 40 to 70 atmospheres pressure and 25° C., of at least 85% at a flux of at least about 400 l/m²d;
   said polyamide layer including a plurality of sites having the formula Ar(CONH-)$_2$COOH, wherein Ar represents the aromatic nucleus residue of the polyfunctional acyl halide.

2. A composite material according to claim 1 wherein said polyamide layer comprises the interfacial reaction product of the components consisting essentially of:

$$Ar(COX)_a \qquad (a)$$

wherein
   Ar represents a mononuclear aromatic nucleus free of any amide-forming groups other than the COX groups;
   X represents halogen of atomic weight ranging from 19 to 130, and
   a represents a number greater than 2 but not greater than the number of available ring positions on said mononuclear aromatic nucleus;
up to about 50% by weight of said Ar(COX)$_a$ being replaceable with the compound Ar(COX)$_{a-1}$, wherein Ar, X and a are as defined previously; and $$Ar'(NH_2)_b \qquad (b)$$

wherein Ar' represents a mononuclear aromatic nucleus free of any acyl halide-reactive groups other than the NH$_2$ groups; and b represents a number greater than 1 but less than a,
said reaction product being substantially insoluble in organic liquid amide, sulfoxide, and pyrrolidone solvents and solvent blends, and having a said salt rejection capability of at least about 94% at 600 l/m²d flux.

3. A composite material according to claim 2 wherein said microporous support layer comprises a water permeable organic polymeric film having millions of pores per square centimeter ranging from about 1 to about 1,000 nanometers in their widest dimension.

4. A composite material according to claim 2 wherein said interfacial reaction product contains at least one unit, per 100,000 polymer molecular weight, of the formula

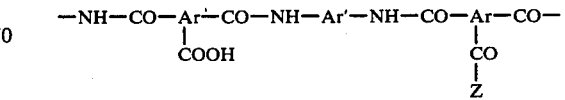

wherein Ar and Ar' are as previously defined, and z is selected from the group consisting of —NH—Ar'—NH—CO—Ar—CO— and

5. A desalinizing layer according to claim 2 wherein said reaction product has been oxidized with an oxidizing agent selected from the group consisting of chlorine and a chlorine-releasing agent.

6. A sheet-like composite material comprising a microporous support layer, and, polymerized in situ thereon, a crosslinked, water permeable, interfacially polymerized polyamide desalinizing membrane comprising the interfacial condensation product of the components consisting essentially of:

$$Ar(COX)_3, \quad (a)$$

wherein Ar represents a carbocyclic, monocyclic aromatic nucleus free of any amide-forming groups other than the COX group, and X represents halogen of atomic weight less than 130; up to about 50% by weight of said $Ar(COX)_3$ being replaceable with the compound $Ar(COX)_2$, wherein Ar and X are as defined previously;

$$Ar'(NH_2)_2, \quad (b)$$

wherein Ar' represents a carbocyclic, monocyclic aromatic nucleus free of any acyl halide-reactive groups other than the primary amine substituents;

said interfacial reaction product having a crosslink density in excess of one per 100,000 polymer molecular weight, being substantially insoluble in organic liquid amide, sulfoxide, and pyrrolidone solvents and solvent blends, and having a salt rejection capability, tested with simulated seawater under 40 to 70 atmospheres pressure and 25° C., of at least about 95 at 600 $1/m^2d$ flux.

7. A composite material according to claim 6 wherein said interfacial condensation product comprises poly(phenylene-diamine trimesamide).

8. A composite material according to claim 6 wherein said condensation product has been treated with an oxidizing agent selected from the group consisting of chlorine and a chlorine-releasing agent.

9. In a process for removing solute from solute-containing water in a single pass through a desalinizing layer, the step comprising passing said water through the sheet-like composite material of claim 1 to remove at least 65% of the solute therefrom.

10. A process for the preparation of a composite reverse osmosis membrane comprising the steps of:
  (a) coating a porous support with a liquid layer comprising an aqueous solution containing, dissolved therein, an essentially monomeric, aromatic polyamine reactant having at least two primary amine substituents substituted on an aromatic nucleus comprising less than 3 aromatic rings; said aromatic polyamine reactant having a solubility in water of at least 0.01% by weight and being free of substituents capable of chemical interference with amide-forming reactions;
  (b) contacting the said liquid layer with an essentially monomeric, aromatic, amine-reactive reactant comprising a volatilizable polyfunctional acyl halide, said polyfunctional acyl halide being selected such that the primary amine functionality of said aromatic polyamine reactant is no more than the carboxylic acid equivalent functionality of said polyfunctional acyl halide; the amine-reactive acyl halide groups of said polyfunctional acyl halide being capable of condensing with primary amine functional groups to form amide linkages in less than 60 seconds under normal ambient temperature and pressure; the aromatic nucleus of said acyl halide comprising less than 3 aromatic rings; said amine-reactive reactant being at least 0.01 weight percent soluble in liquid aliphatic or liquid halogenated aliphatic solvents; said aromatic nucleus of said polyfunctional acyl halide being free of substituents capable of chemical interference with intermolecular amide-forming condensation reactions; thereby interfacially condensing said amine-reactive reactant with said polyamine reactant, for an effective amount of interfacial condensation reaction time ranging up to about 60 seconds, until a crosslinked, interfacial polyamide layer has been formed, said polyamide having a plurality of sites having the formula $Ar(CONH-)_2COOH$, wherein Ar represents the aromatic nucleus of the polyfunctional acyl halide; and said polyamide having a solubility of less than 10% by weight in liquid organic amide, sulfoxide, and pyrrolidone solvents or solvent blends; and
  (c) drying the product of step (b) to form a composite reverse osmosis membrane having a salt rejection capability, tested with simulated sea water under 40 to 70 atmospheres pressure and 25° C., of at least 85% at a flux of at least about 400 $1/m^2d$.

11. A method according to claim 10 wherein said amine-reactive reactant is contained in solution in a non-hydrolytic, non-polar organic liquid solvent system, and the interfacial condensation reaction occurs at the interface of the solution containing the said amine-reactive reactant and the said aqueous solution.

12. A method according to claim 10 wherein said solutions are essentially neutral and are essentially free of acid acceptors.

13. A method according to claim 10 wherein said salt rejection capability is at least 94%.

14. A method according to claim 10 wherein the said interfacial polyamide layer is treated with an oxidizing agent to improve its chlorine resistance.

15. A method according to claim 10 wherein the said interfacial polyamide layer is treated with chlorine or a chlorine-releasing agent to improve its chlorine resistance.

16. A method according to claim 10 wherein hydrolysis of acyl halide groups of said polyfunctional acyl halide precedes condensation with amine groups of said aromatic polyamine reactant.

17. A method according to claim 10 wherein the aromatic nucleus of said polyfunctional acyl halide has open positions ortho to the acyl halide groups.

18. A method according to claim 17 wherein said polyfunctional acyl halide is a trimesoylhalide.

19. A method according to claim 18 wherein said crosslinked, interfacial polyamide layer comprises poly(phenylene-diamine trimesamide).

20. A composite material according to claim 1, wherein the aromatic nucleus of said polyfunctional acyl halide has open positions ortho to the acyl halide groups.

21. A composite reverse osmosis membrane made according to claim 10.

* * * * *

UNITED STATES PATENT AND TRADEMARK OFFICE
CERTIFICATE OF CORRECTION

PATENT NO. : 4,277,344

DATED : July 7, 1981

INVENTOR(S) : John E. Cadotte

It is certified that error appears in the above-identified patent and that said Letters Patent are hereby corrected as shown below:

Column 1, lines 53 and 54, for "required" read --require--.
Column 3, line 12, for "monomes" read --monomers--.
Column 3, line 14, for "membrane is" read --membrane) is--.
Column 3, line 44, for "desalinationmem-" read
  --desalination mem- --.
Column 3, line 48, for "requirements" read --requirement--.
Column 4, line 27, for "Counsil" read --Council--.
Column 4, lines 60-61, for "Membranescontains" read
  --Membranes contains--.
Column 5, line 40, for "practice" read --practical--.
Column 5, line 53, for "formingcondensation" read
  --forming condensation--.
Column 10, line 48, for "material" read --marginal--.
Column 16, line 50, for "glass but some" read --glass had some--.
Column 21, line 52, for "armoatic" read --aromatic--.

Signed and Sealed this

Twenty-fourth Day of November 1981

[SEAL]

Attest:

GERALD J. MOSSINGHOFF

Attesting Officer     Commissioner of Patents and Trademarks